(12) United States Patent
Chae et al.

(10) Patent No.: US 11,510,179 B2
(45) Date of Patent: Nov. 22, 2022

(54) METHOD FOR SELECTING RESOURCE FROM TWO OR MORE CARRIERS AND BANDWIDTH PART AND TRANSMITTING SIDELINK SIGNAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/963,480

(22) PCT Filed: Jan. 30, 2019

(86) PCT No.: PCT/KR2019/001295
§ 371 (c)(1),
(2) Date: Jul. 20, 2020

(87) PCT Pub. No.: WO2019/151773
PCT Pub. Date: Aug. 8, 2019

(65) Prior Publication Data
US 2021/0051630 A1 Feb. 18, 2021

Related U.S. Application Data

(60) Provisional application No. 62/623,553, filed on Jan. 30, 2018.

(51) Int. Cl.
*H04W 72/02* (2009.01)
*H04W 72/04* (2009.01)
*H04W 92/18* (2009.01)

(52) U.S. Cl.
CPC ....... *H04W 72/02* (2013.01); *H04W 72/0453* (2013.01); *H04W 72/0493* (2013.01); *H04W 92/18* (2013.01)

(58) Field of Classification Search
CPC ............. H04W 72/02; H04W 72/0453; H04W 72/0493; H04W 92/18; Y02D 30/70
See application file for complete search history.

(56) References Cited

U.S. PATENT DOCUMENTS

2013/0178221 A1 7/2013 Jung et al.
2018/0070293 A1* 3/2018 Venkataraman .. H04W 72/0453
(Continued)

FOREIGN PATENT DOCUMENTS

WO 2017/222207 12/2017

OTHER PUBLICATIONS

Huawei, HiSilicon, "Remaining Details of Mode-4 Resource Selection and Power Sharing for eV2X", 3GPP TSG RAN WG1 Meeting #91 R1-1719511, Reno USA Nov. 27-Dec. 1, 2017 (Year: 2017).*

(Continued)

*Primary Examiner* — Brandon J Miller
(74) *Attorney, Agent, or Firm* — Lee Hong Degerman Kang Waimey

(57) ABSTRACT

Disclosed herein is a method of transmitting a sidelink signal by a user equipment (UE) in a wireless communication system including selecting a plurality of resources from two or more frequency resources, and transmitting a sidelink signal based on the plurality of selected resources, wherein the UE selects the plurality of resources based on i) continuity of frequency resources ii) maximum power reduction (MPR) in sequence.

11 Claims, 11 Drawing Sheets

(56) References Cited

U.S. PATENT DOCUMENTS

2019/0200366 A1* 6/2019 Park .................. H04W 72/0486
2019/0208441 A1* 7/2019 Wang .................. H04B 17/318

OTHER PUBLICATIONS

Qualcomm Incorporated, "MPR Issue with Distributed RB Allocation in UL", 3GPP TSG RAN WG1 Meeting 90bis R1-1718576, Prague CZ, Oct. 9-13, 2017 (Year: 2017).*

Intel Corporation, "Physical Layer Aspects of Sidelink Carrier Aggregation for Mode-4 LTE V2V Communication", 3GPP TSG RAN WG1 Meeting #91 R1-1720031, Reno USA, Nov. 27-Dec. 1, 2017 (Year: 2017).*

Huawei et al., "Remaining details of mode-4 resource selection and power sharing for eV2X," 3GPP TSG RAN WG1 Meeting #91, R1-1719511, Reno, USA, Nov. 27-Dec. 1, 2017, 6 pages.

Qualcomm Incorporated, "MPR issue with distributed RB allocation in UL," 3GPP TSG RAN WG1 Meeting 90bis, R1-1718576, Prague, CZ, Oct. 9-13, 2017, 6 pages.

Intel Corporation, "Physical Layer Aspects of Sidelink Carrier Aggregation for Mode-4 LTE V2V Communication," 3GPP TSG RAN WG1 Meeting #91, R1-1720031, Reno, USA, Nov. 27-Dec. 1, 2017, 8 pages.

* cited by examiner (a) DMRS location for Rel. 12/13 PSBCH (b) DMRS location for V2V PSBCH

METHOD FOR SELECTING RESOURCE FROM TWO OR MORE CARRIERS AND BANDWIDTH PART AND TRANSMITTING SIDELINK SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2019/001295, filed on Jan. 30, 2019, which claims the benefit of U.S. Provisional Application No. 62/623,553, filed on Jan. 30, 2018, the contents of which are all hereby incorporated by reference herein in their entirety.

BACKGROUND OF THE INVENTION

1. Field of the Invention

The present disclosure relates to a wireless communication system, and, more particularly, to a method of selecting resources from two or more carriers and bandwidth parts and transmitting a sidelink signal.

2. Description of the Related Art

As more communication apparatuses require larger communication capacities, there is a need for improved mobile broadband communication compared to a conventional radio access technology. In addition, massive machine type communications (mMTC) for providing various services anytime anywhere by connecting a plurality of devices and things is also one of major issues to be considered in next-generation communication. In addition, communication system design considering services/UEs sensitive to reliability and latency is being discussed. Introduction of next-generation RAT considering Enhanced mobile Broadband Communication (eMBB), mMTC, Ultra-Reliable and Low Latency Communication (URLLC), etc. is being discussed. In this disclosure, this technology is referred to new radio (NR) for convenience. NR is an expression indicating an example of 5G radio access technology (RAT).

A new RAT system including NR uses an OFDM transmission method or a transmission method similar thereto. The new RAT system may follow OFDM parameters different from OFDM parameters of LTE. Alternatively, the new RAT system may follow numerology of existing LTE/LTE-A but may have a larger system bandwidth (e.g., 100 MHZ). Alternatively, one cell may support a plurality of numerologies. That is, user equipments (UEs) operating with different numerologies may coexist in one cell.

Vehicle-to-everything (V2X) means communication technology for exchanging information with other vehicles, pedestrians and things equipped with infrastructure through wired/wireless communication, and may include four types such as vehicle-to-vehicle (V2V), vehicle-to-infrastructure (V2I), vehicle-to-network (V2N) and vehicle-to-pedestrian (V2P). V2X communication may be provided through a PC5 interface and/or a Uu interface.

SUMMARY OF THE INVENTION

An object of the present disclosure is to provide a method of selecting resources from two or more carriers and bandwidth parts.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an embodiment of the present disclosure, provided is a method of transmitting a sidelink signal by a user equipment (UE) in a wireless communication system including selecting a plurality of resources from two or more frequency resources, and transmitting a sidelink signal based on the plurality of selected resources, wherein the UE selects the plurality of resources based on i) continuity of frequency resources ii) maximum power reduction (MPR) in sequence.

According to another embodiment of the present disclosure, provided is a user equipment (UE) apparatus for transmitting a sidelink signal in a wireless communication system including a memory and a processor coupled to the memory, wherein the processor selects a plurality of resources from two or more frequency resources and transmits a sidelink signal based on the plurality of selected resources, and wherein the processor selects the plurality of resources based on i) continuity of frequency resources ii) maximum power reduction (MPR) in sequence.

The UE may preferentially select the plurality of resources from two or more continuous frequency resources.

When there is no resource to be selected from the two or more continuous frequency resources, the plurality of resources may be selected according to MPR according to a combination of two or more frequency resources.

The smaller the MPR according to the combination of two or more frequency resources, the higher a priority.

When the UE selects the plurality of resources from the two or more frequency resources for each frequency resource, a resource selection probability of frequency resources contiguous to a first selected frequency resource may increase by an inversely proportional function of MPR When the UE selects the plurality of resources from resources each having a measured signal to strength equal to or less than a predetermined value, the MPR may be added to the measured signal strength as a positive offset.

The measured signal strength may be a sidelink received signal strength indicator (S-RSSI).

The frequency resources may be one of canners or bandwidth parts.

The UE may select the frequency resources based on a channel busy ratio (CBR).

The UE may always select the two frequency resources based on a sum of CBRs of continuous frequency resources.

The UE may preferentially select continuous frequency resources when a sum of CBRs of frequency resources is equal to or less than a preset value.

The UE may randomly select the frequency resources when a sum of CBRs of frequency resources is equal to or less than a preset value.

BRIEF DESCRIPTION OF THE DRAWINGS

The accompany drawings which are included for further understanding of the disclosure and included in this disclosure and which form part of the disclosure illustrate embodiments of the disclosure along with the detailed description that describes the principle of the disclosure.

DESCRIPTION OF THE PREFERRED EMBODIMENTS

Figure 1:
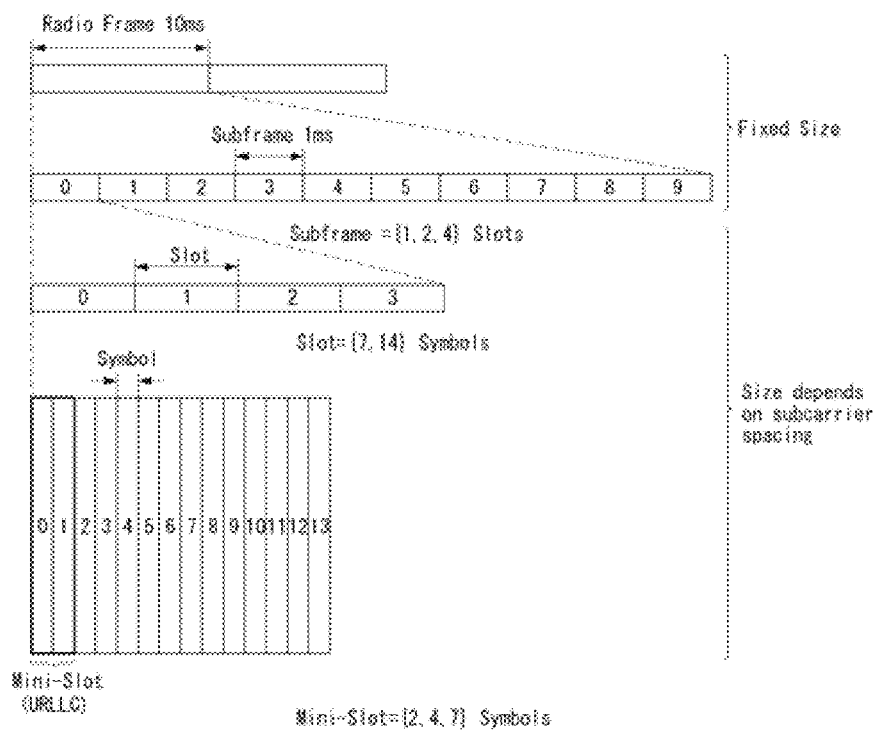
FIG. 1 is a view showing an example of a frame structure in NR.

In the disclosure, downlink (DL) refers to communication from a base station (BS) to a user equipment (UE), and uplink (UL) refers to communication from the UE to the BS. On DL, a transmitter may be a part of the BS and a receiver may be a part of the UE, whereas on UL, a transmitter may be a part of the UE and a receiver may be a part of the BS. ABS may be referred to as a first communication device, and a UE may be referred to as a second communication device in the present disclosure. The term BS may be replaced with fixed station, Node B, evolved Node B (eNB), next generation Node B (gNB), base transceiver system (BTS), access point (AP), network or 5G network node, artificial intelligence (AI) system, road side unit (RSU), robot and so on. The term UE may be replaced with terminal, mobile station (MS), user terminal (UT), mobile subscriber station (MSS), subscriber station (SS), advanced mobile station (AMS), wireless terminal (WT), device-to-device (D2D) device, vehicle, robot, AI module and so on.

The following technology may be used in various wireless access systems including code division multiple access (CDMA), frequency division multiple access (FDMA), time division multiple access (TDMA), orthogonal frequency division multiple access (OFDMA), and single carrier FDMA (SC-FDMA). CDMA may be implemented by radio technologies such as Universal Terrestrial Radio Access (UTRA) or CDMA2000. TDMA may be implemented by radio technologies such as Global System for Mobile communications (GSM)/General Packet Radio Service (GPRS)/Enhanced Data Rates for GSM Evolution (EDGE). OFDMA may be implemented by radio technologies such as IEEE 802.11 (Wi-Fi), IEEE 802.16 (WiMAX), IEEE 802-20 or E-UTRA (Evolved UTRA). UTRA is part of a Universal Mobile Telecommunications System (UMTS). 3rd Generation Partnership Project (3GPP) Long Term Evolution (LTE) is part of an Evolved UMTS (E-UMTS) using E-UTRA, and LTE-A (Advanced)/LTE-A pro is an evolved version of 3GPP LTE. New Radio or New Radio Access Technology (3GPP NR) is an evolved version of 3GPP LTE/LTE-A/LTE-A pro.

In order to clarify the description, the description is based on a 3GPP communication system (e.g., LTE-A or NR), but the technical spirit of the present disclosure is not limited thereto. LTE means technology after 3GPP TS 36.xxx Release 8. Specifically, LTE technology after 3GPP TS 36.xxx Release 10 is referred to as LTE-A and LTE technology after 3GPP TS 36.xxx Release 13 is referred to as LTE-A pro. 3GPP NR means technology after TS 38.xxx Release 15. LTE/NR may be referred to as a 3GPP system. "xxx" means a detailed standard document number. LTE/NR may be collectively referred to as a to 3GPP system.

In this disclosure, a node refers to a fixed point capable of transmitting/receiving a radio signal through communication with a UE. Various types of BSs may be used as nodes regardless of the name thereof. For example, a BS, NB, eNB, pico-cell eNB (PeNB), home eNB (HeNB), relay, repeater, etc. may be a node. In addition, the node may not be a BS. For example, the node may be a radio remote head (RRH) or a radio remote unit (RRU). The RRH, the RRU, etc. generally have lower power levels than the BS. At least one antenna is installed in one node. The antenna may mean a physical antenna or may mean an antenna port, a virtual antenna or an antenna group. The node may be referred to as a point.

In the present disclosure, a cell may refer to a certain geographical area or radio resources, in which one or more nodes provide a communication service. A "cell" as a geographical area may be understood as coverage in which a service may be provided in a carrier, while a "cell" as radio resources is associated with the size of a frequency configured in the carrier, that is, a bandwidth (BW). Because a range in which a node may transmit a valid signal, that is, DL coverage and a range in which the node may receive a valid signal from a UE, that is, UL coverage depend on a carrier carrying the signals, and thus the coverage of the node is associated with the "cell" coverage of radio resources used by the node. Accordingly, the term "cell" may mean the service overage of anode, radio resources, or a range in which a signal reaches with a valid strength in the radio resources, under circumstances.

In the present disclosure, communication with a specific cell may amount to communication with a BS or node that provides a communication service to the specific cell. Further, a DL/UL signal of a specific cell means a DL/UL signal from/to a BS or node that provides a communication service to the specific cell. Particularly, a cell that provides a UL/DL communication service to a UE is called a serving cell for the UE. Further, the channel state/quality of a specific cell refers to the channel state/quality of a channel or a communication link established between a UE and a BS or node that provides a communication service to the specific cell.

A "cell" associated with radio resources may be defined as a combination of DL resources and UL resources, that is, a combination of a DL component carrier (CC) and a UL CC. A cell may be configured with DL resources alone or both DL resources and UL resources in combination. When carrier aggregation (CA) is supported, linkage between the carrier frequency of DL resources (or a DL CC) and the carrier frequency of UL resources (or a UL CC) may be indicated by system information transmitted in a corresponding cell. A carrier frequency may be identical to or different from the center frequency of to each cell or CC. Hereinbelow, a cell operating in a primary frequency is referred to as a primary cell (Pcell) or PCC, and a cell operating in a secondary frequency (or SCC) is referred to as a secondary cell (Scell) or SCC. The Scell may be configured after a UE and a BS perform a radio resource control (RRC) connection establishment procedure and thus an RRC connection is established between the UE and the BS, that is, the UE is RRC_CONNECTED. The RRC connection may mean a path in which the RRC of the UE may exchange RRC messages with the RRC of the BS. The Scell may be configured to provide additional radio resources to the UE. The Scell and the Pcell may form a set of serving cells for the UE according to the capabilities of the UE. Only one serving cell configured with a Pcell exists for an RRC_CONNECTED UE which is not configured with CA or does not support CA.

A cell supports a unique radio access technology (RAT). For example, LTE RAT-based transmission/reception is performed in an LTE cell, and 5G RAT-based transmission/reception is performed in a 5G cell.

CA aggregates a plurality of carriers each having a smaller system BW than a target BW to support broadband. CA differs from OFDMA in that DL or UL communication is conducted in a plurality of carrier frequencies each forming a system BW (or channel BW) in the former, and DL or UL communication is conducted by loading a basic frequency band divided into a plurality of orthogonal subcarriers in one carrier frequency in the latter. In OFDMA or orthogonal frequency division multiplexing (OFDM), for example, one frequency band having a certain system BW is divided into a plurality of subcarriers with a predetermined subcarrier spacing, information/data is mapped to the plurality of subcarriers, and the frequency band in which the information/data has been mapped is transmitted in a carrier frequency of the frequency band through frequency upconversion. In wireless CA, frequency bands each having a system BW and a carrier frequency may be used simultaneously for communication, and each frequency band used in CA may be divided into a plurality of subcarriers with a predetermined subcarrier spacing.

The 3GPP communication standards define DL physical channels corresponding to resource elements (REs) conveying information originated from upper layers of the physical layer (e.g., the medium access control (MAC) layer, the radio link control (RLC) layer, the packet data convergence protocol (PDCP) layer, the radio resource control (RRC) layer, the service data adaptation protocol (SDAP) layer, and the non-access stratum (NAS) layer), and DL physical signals corresponding to REs which are used in the physical layer but do not deliver information originated from the upper layers. For to example, physical downlink shared channel (PDSCH), physical broadcast channel (PBCH), physical multicast channel (PMCH), physical control format indicator channel (PCFICH), and physical downlink control channel (PDCCH) are defined as DL physical channels, and a reference signal (RS) and a synchronization signal are defined as DL physical signals. An RS, also called a pilot is a signal in a predefined special waveform known to both a BS and a UE. For example, cell specific RS (CRS), UE-specific RS (UE-RS), positioning RS (PRS), channel state information RS (CSI-RS), and demodulation RS (DMRS) are defined as DL RSs. The 3GPP communication standards also define UL physical channels corresponding to REs conveying information originated from upper layers, and UL physical signals corresponding to REs which are used in the physical layer but do not carry information originated from the upper layers. For example, physical uplink shared channel (PUSCH), physical uplink control channel (PUCCH), and physical random access channel (PRACH) are defined as UL physical channels, and DMRS for a UL control/data signal and sounding reference signal (SRS) used for UL channel measurement are defined.

In this disclosure, a physical downlink control channel (PDCCH) and a physical downlink shared channel (PDSCH) may mean a set of time-frequency resources or a set of resource elements carrying downlink control information (DCI) and downlink data of a physical layer. In addition, a physical uplink control channel, a physical uplink shared channel (PUSCH) and a physical random access channel means a set of time-frequency resources or a set of resource elements carrying uplink control information (UCI), uplink data and random access signals of a physical layer. Hereinafter, a UE transmitting an uplink physical channel (e.g., PUCCH, PUSCH or PRACH) may mean that DCI, uplink data or random access signals are transmitted over or through the uplink physical channel. A BS receiving an uplink physical channel may mean that DCI, uplink data or random access signals are received over or through the uplink physical channel. A BS transmitting a downlink physical channel (e.g., PDCCH or PDSCH) is used as the same meaning as transmission of DCI or uplink data over or through the downlink physical channel. A UE receiving a downlink physical channel may mean that DCI or uplink data is received over or through the downlink physical channel.

In this disclosure, a transport block is a payload for a physical layer. For example, data given to a physical layer from a higher layer or a medium access control (MAC) layer is basically referred to as a transport block.

In the present disclosure, HARQ is a kind of error control technique. A HARQ-ACK transmitted to on DL is used for error control of UL data, and a HARQ-ACK transmitted on UL is used for error control of DL data A transmitter performing an HARQ operation awaits reception of an ACK after transmitting data (e.g., a TB or a codeword). A receiver performing an HARQ operation transmits an ACK only when data has been successfully received, and a negative ACK (NACK) when the received data has an error. Upon receipt of the ACK, the transmitter may transmit (new) data, and upon receipt of the NACK, the transmitter may retransmit the data Time delay occurs until ACK/NACK is received from a UE and retransmission data is transmitted after the BS transmits scheduling information and data according to the scheduling information. Such time delay occurs due to channel propagation delay or a time required to decode/encode data. Accordingly, when new data is transmitted after a HARQ process which is currently in progress is finished, a gap occurs in data transmission due to time delay. Accordingly, a plurality of independent HARQ processes is used to prevent a gap from occurring in data transmission during a time delay period. For example, when there are seven transmission occasions between initial transmission and retransmission, a communication device may perform data transmission without a gap by performing seven independent HARQ processes. When a plurality of parallel HARQ processes is used, UL/DL transmission may be continuously performed while waiting for HARQ feedback for previous UL/DL transmission.

In the present disclosure, CSI generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

In the present disclosure, frequency division multiplexing (FDM) is transmission/reception of signals/channels/users in different frequency resources, and time division multiplexing (TDM) is transmission/reception of signals/channels/users in different time resources.

In the present disclosure, frequency division duplex (FDD) is a communication scheme in which UL communication is performed in a UL carrier, and DL communication is performed in a DL carrier linked to the UL carrier, whereas time division duplex (TDD) is a communication scheme in which UL communication and DL communication are performed in time division in the same carrier.

For background technologies, terms, abbreviations used in this disclosure, refer to matters described in the standard documents published prior to the present disclosure. For example, documents to corresponding to 3GPP TS 36, 24 and 38 series (http://www.3gpp.org/specifications/specification-numbering) may be referred to.

Frame Structure

FIG. 1 is a view showing an example of a frame structure in NR.

The NR system may support a plurality of numerologies. Here, the numerology may be defined by a subcarrier spacing and cyclic prefix (CP) overhead. At this time, a plurality of subcarrier spacings may be derived by scaling a basic subcarrier spacing with an integer N (or μ). In addition, even if it is assumed that a very low subcarrier spacing is not used in a very high carrier frequency, a used numerology may be selected independently of the frequency band of a cell. In addition, in the NR system, various frame structures according to the plurality of numerologies may be supported.

Hereinafter, an orthogonal frequency division multiplexing (OFDM) numerology and a frame structure which may be considered in the NR system will be described. The plurality of OFDM numerologies supported in the NR system may be defined as shown in Table 1. μ and cyclic prefix for a bandwidth part are obtained from RRC parameters provided by the BS.

TABLE 1

| μ | $\Delta f = 2^\mu * 15$ [kHz] | Cyclic prefix(CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports the plurality of numerologies (e.g., subcarrier spacings) supporting various 5G services. For example, when the subcarrier spacing is 15 kHz, a wide area in traditional cellular bands is supported. When the subcarrier spacing is 30 kHz/60 kHz, dense-urban, lower latency and wider carrier bandwidth are supported. When the subcarrier spacing is equal to or higher than 60 kHz, bandwidth greater than 24.25 GHz is supported to overcome phase noise.

Resource Grid

Figure 2:
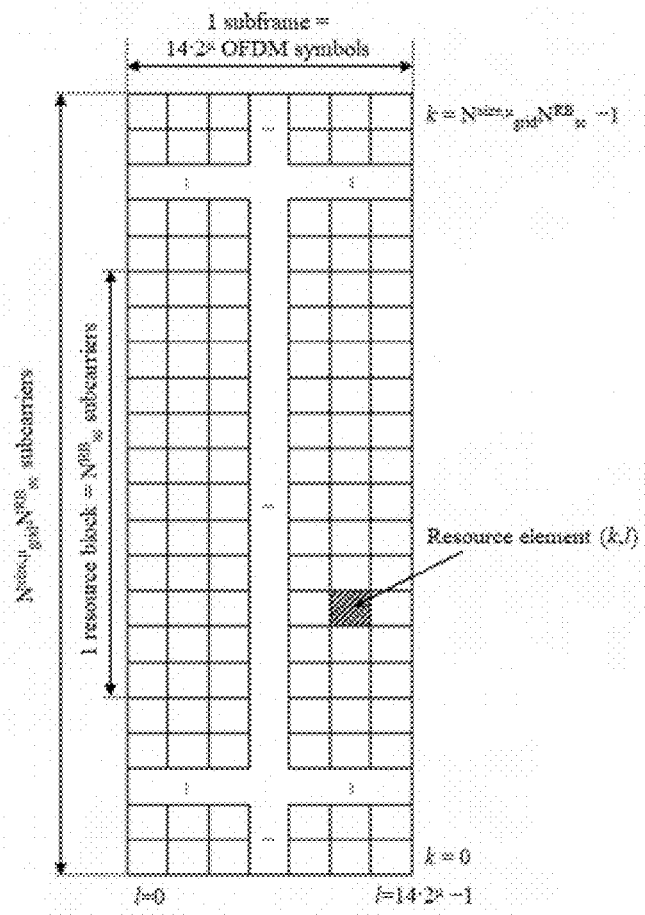
FIG. 2 is a view showing an example of a resource grid in NR.

FIG. 2 is a view showing an example of a resource grid in NR.

Referring to FIG. 2, for each subcarrier spacing setting and carrier, a resource grid of $N^{size,\mu}_{grid} * N^{RB}_{sc}$ subcarriers and $14 \cdot 2^\mu$ OFDM symbols is defined. Here, $N^{size,\mu}_{grid}$ is indicated by RRC to signaling from the BS. $N^{size,\mu}_{grid}$ may vary according to uplink and downlink as well as the subcarrier spacing setting μ. There is one resource grid for subcarrier spacing setting μ, antenna port p and a transmission direction (uplink or downlink). Each element of the resource grid for subcarrier spacing setting μ and antenna port p is referred to as a resource element and is uniquely identified by an index pair (k,l). Here, k denotes an index in a frequency domain and l denotes a symbol location in the frequency domain relative to a reference point. A resource element (k,l) for subcarrier spacing setting μ and antenna port p correspond to physical resource and complex value $a^{(p,\mu)}_{k,l}$. A resource block (RB) is defined by $N^{RB}_{sc}=12$ consecutive subcarriers in the frequency domain.

Considering that the UE cannot support a wide bandwidth to be supported in the NR system at once, the UE may be configured to operate in a part of the frequency bandwidth of the cell (hereinafter referred to as a bandwidth part (BWP)).

Bandwidth Part (MVP)

In the NR system, up to 400 MHz may be supported per carrier. If a UE operating in such a wideband carrier operates in a state in which a radio frequency (RF) module for the entire carrier is always turned on, UE battery consumption may increase. Alternatively, considering various use cases (e.g., eMBB, URLLC, mMTC, V2X, etc.) in which the UE operates in one wideband carrier, different numerologies (e.g., subcarrier spacings) may be supported for each frequency band in the carrier. Alternatively, capabilities for maximum bandwidth may vary according to UE. In consideration of this, the BS may instruct the UE to operate in a partial bandwidth rather than the entire bandwidth of the wideband carrier, and the partial bandwidth may be referred to as a bandwidth part (BWP). In the frequency domain, the BWP is a subset of contiguous common resource blocks defined for numerology μi in the bandwidth part i on the carrier, and one numerology (e.g., a subcarrier spacing, a CP length, a slot/mini-slot duration) may be set.

Meanwhile, the BS may set one or more BWPs in one carrier set for the UE. Alternatively, when UEs are concentrated on a specific BWP, some UEs may move to another BWP for load balancing. Alternatively, in consideration of frequency domain inter-cell interference cancellation between neighbor cells, some spectrums of the entire bandwidth may be excluded and both BWPs of a cell may be set in the same slot. That is, the BS may set at least one DL/UL BWP for a UE associated with the wideband carrier, and at least one of DL/UL BWP(s) set at a specific time may be activated (by L1 signaling which is a physical layer control signal, a MAC control element (CE) which is a MAC layer control signal, or RRC to signaling), switching to another set DL/UL BWP may be indicated (by L1 signaling MAC CE, or RRC signaling), or a timer value may be set to switch a DL/UL BWP determined by the UE when the timer expires. The activated DL/UL BWP is particularly referred to an active DL/UL BWP. When the UE is in an initial access process or before RRC connection of the UE is established, the UE may not receive a configuration for the DL/UL BWP. In this situation DL/UL BWP assumed by the UE may be referred to as an initial active DL/UL BWP.

Synchronization Acquisition of Sidelink UE

In a time division multiple access (TDMA) and frequency division multiples access (FDMA) system, accurate time and frequency synchronization is essential. When time and frequency synchronization is not accurate, inter-symbol interference (ISI) and intercarrier interference (ICI) are caused, thereby deteriorating system performance. The same is true in V2X. In V2X, for time/frequency synchronization, a sidelink synchronization signal (SLSS) may be used in a physical layer and master information block-sidelink-V2X (MIB-SL) may be used in a radio link control (RLC) layer.

Figure 3:
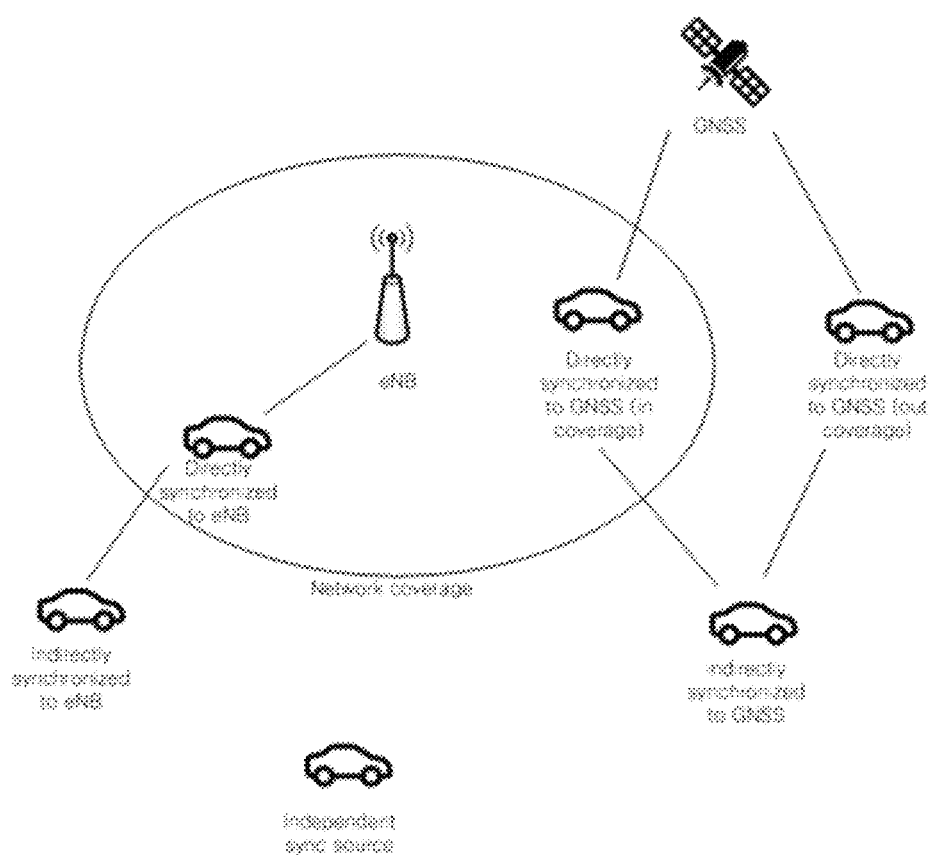
FIG. 3 is a view illustrating sidelink synchronization.

FIG. 3 is a view showing an example of a source of synchronization or a criterion of synchronization in V2X.

As shown in FIG. 3, in V2X, a UE may be directly synchronized to a global navigation satellite systems (GNSS) or may be indirectly synchronized to the GNSS through a UE directly synchronized to the GNSS (inside network coverage or outside network coverage). When the GNSS is set as a synchronization source, the UE may calculate a direct frame number (DFN) and a subframe number using coordinated universal time (UTC) and a (pre)determined DFN offset.

Alternatively, the UE may be directly synchronized to an eNB or may be synchronized to another UE time/frequency-synchronized to the eNB. For example, when the UE is located inside network coverage, the UE may receive synchronization information provided by the eNB and may be directly synchronized to the eNB. Thereafter, synchronization information may be provided to another adjacent UE. When eNB timing is set as a criterion of synchronization, for synchronization and downlink measurement, the UE may follow a cell associated with a corresponding frequency (when being inside cell coverage at the frequency) and a primary cell or a serving cell (when being outside cell coverage at the frequency).

The eNB (serving cell) may provide synchronization setting for a carrier used for V2X sidelink communication. In this case, the UE may follow synchronization setting received from the eNB. If no cell to is detected in the carrier used for V2X sidelink communication and synchronization setting is not received from the serving cell, the UE may follow preset synchronization setting.

Alternatively, the UE may be synchronized to another UE which does not directly or indirectly acquire synchronization information from the eNB or the GNSS. The source and preference of synchronization may be pre-set for the UE or may be set through a control message provided by the eNB.

Now, a synchronization signal (SLSS) and synchronization information will be described.

The SLSS is a sidelink-specific sequence and may include a primary sidelink synchronization signal (PSSS) and a secondary sidelink synchronization signal (SSSS).

Each SLSS may have a physical layer sidelink synchronization Identity (ID) and the value thereof may be any one of 0 to 335. The synchronization source may be identified according to which of the above-described values is used. For example, 0, 168 and 169 may mean the GNSS, 1 to 167 may mean the eNB, and 170 to 335 may mean the outside of coverage. Alternatively, among the values of the physical layer sidelink synchronization ID, 0 to 167 may be values used by a network and 168 to 335 may be values used outside network coverage.

Figure 4:
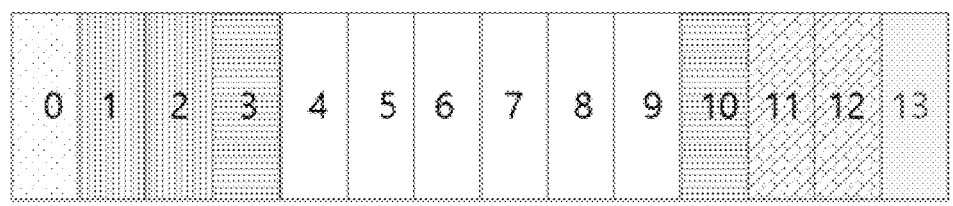
FIG. 4 is a view showing a time resource unit in which a sidelink synchronization signal is transmitted.
Figure 4:
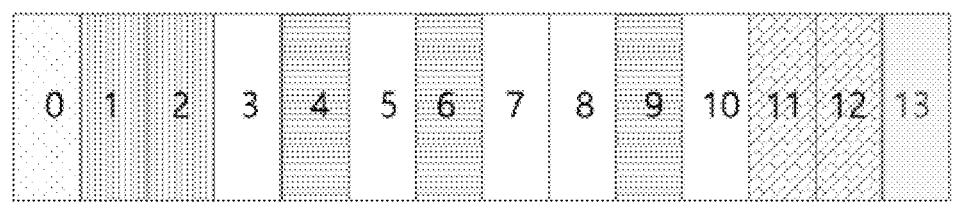
Figure 4:
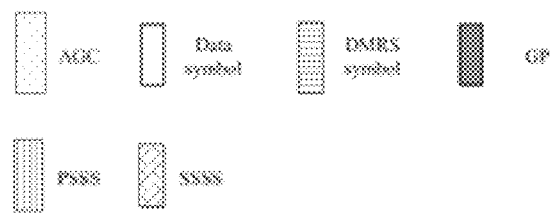

FIG. 4 is a view showing a time resource unit in which a sidelink synchronization signal is transmitted. Here, the time resource unit may mean a subframe in LTE/LTE-A and a slot in 5G, details of which are disclosed in 3GPP TS 36 series or 38 series. A physical sidelink broadcast channel (PSBCH) may be a channel in which basic (system) information, which should be first known to the UE before sidelink signal transmission/reception (e.g., information related to the SLSS, a duplex mode (DM), a TDD UL/DL configuration, resource pool related information, the type of an application related to the SLSS, a subframe offset, broadcast information, etc.) is transmitted (broadcast). The PSBCH may be transmitted in the same time resource unit as the SLSS or a subsequent time resource unit. The DMRS may be used for demodulation of the PSBCH.

Sidelink Transmission Mode

In sidelink, there are transmission modes 1, 2, 3 and 4.

In transmission mode 1/3, an eNB performs resource scheduling through a PDCCH (more specifically, DCI) with respect to a UE 1, and the UE 1 performs D2D/V2X communication with a UE 2 according to the resource scheduling. The UE 1 may transmit sidelink control information (SCI) to the UE 2 through a physical sidelink control channel (PSCCH) and then transmit data based on the SCI through a physical sidelink shared channel (PSSCH). Transmission mode 1 is applicable to D2D and to transmission mode 3 is applicable to V2X.

Transmission mode 2/4 may be a mode in which a UE performs scheduling by itself. More specifically, transmission mode 2 is applicable to D2D and a UE may select resources by itself in a set resource pool to perform D2D operation. Transmission mode 4 is applicable to V2X and a UE may select resources by itself within a selection window through a sensing process and then perform V2X operation. The UE 1 may transmit SCI to the UE 2 through a PSCCH and then transmit data based on the SCI through a PSSCH. Hereinafter, the transmission mode may be briefly referred to as a mode.

Control information transmitted from the eNB to the UE through the PDCCH may be referred to as downlink control information (DCI) and control information transmitted from the UE to another UE through a PSCCH may be referred to as SCI. The SCI may deliver sidelink scheduling information. The SCI may have various formats, for example, SCI format 0 and SCI format 1.

SCI format 0 may be used for scheduling of the PSSCH. SCI format 0 may include a frequency hopping flag (1 bit), a resource block allocation and hopping resource allocation field (the number of bits may vary depending on the number of resource blocks of sidelink), a time resource pattern (7 bits), modulation and coding scheme (MCS) (5 bits), time advance indication (11 bits), a group destination ID (8 bits), etc.

SCI format may be used for scheduling of the PSSCH. SCI format 1 includes priority (3 bits), resource reservation (4 bits), frequency resource locations of initial transmission and retransmission (the number of bits may vary according to the number of subchannels of sidelink), a time gap between initial transmission and retransmission (4 bits), MCS (5 bits), a retransmission index (1 bit), reserved information bit, etc. Hereinafter, the reserved information bit may be briefly referred to as a reserved bit. The reserved bit may be added until the bit size of SCI format 1 becomes 32 bits.

SCI format 0 may be used in transmission modes 1 and 2 and SCI format 1 may be used in transmission modes 3 and 4.

Sidelink Resource Pool

Figure 5:
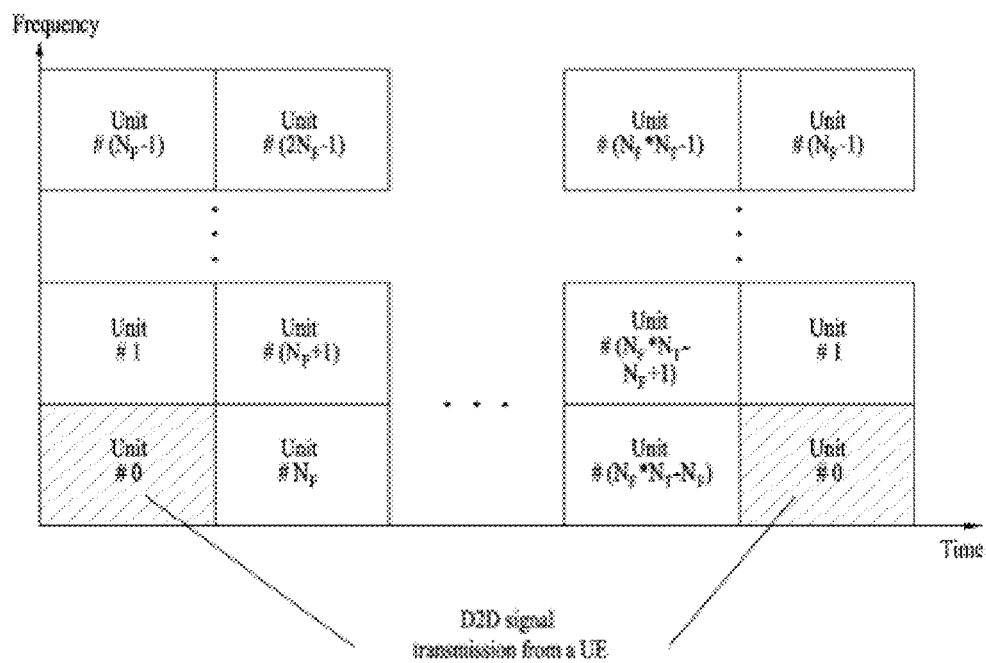
FIG. 5 is a view showing an example of a sidelink resource pool.

FIG. 5 shows an example of a first UE (UE1), a second UE (UE2) and a resource pool used by UE1 and UE2 performing sidelink communication. In FIG. 5($a$), a UE corresponds to a terminal or such a network device as an eNB transmitting and receiving a signal according to a sidelink communication scheme. A UE selects a resource unit corresponding to a specific resource from a resource pool corresponding to a set of resources and the UE transmits a sidelink signal using the selected resource unit to UE2 corresponding to a receiving UE receives a configuration of a resource pool in which UE1 is able to transmit a signal and detects a signal of UE1 in the resource pool. In this case, if UE1 is located at the inside of coverage of an eNB, the eNB may inform UE1 of the resource pool. If UE1 is located at the outside of coverage of the eNB, the resource pool may be informed by a different UE or may be determined by a predetermined resource. In general, a resource pool includes a plurality of resource units. A UE selects one or more resource units from among a plurality of the resource units and may be able to use the selected resource unit(s) for sidelink signal transmission. FIG. 5($b$) shows an example of configuring a resource unit Referring to FIG. 5($b$), the entire frequency resources are divided into the NF number of resource units and the entire time resources are divided into the NT number of resource units. In particular, it is able to define NF*NT number of resource units in total. In particular, a resource pool may be repeated with a period of NT time resource units. Specifically, as shown in FIG. 5, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a sidelink signal.

A resource pool may be classified into various types. First of all, the resource pool may be classified according to contents of a sidelink signal transmitted via each resource pool. For example, the contents of the sidelink signal may be classified into various signals and a separate resource pool may be configured according to each of the contents. The contents of the sidelink signal may include a scheduling assignment (SA or physical sidelink control channel (PSCCH)), a sidelink data channel, and a discovery channel. The SA may correspond to a signal including information on a resource position of a sidelink data channel, information on a modulation and coding scheme (MCS) necessary for modulating and demodulating a data channel, information on a MIMO transmission scheme, information on a timing advance (TA), and the like. The SA signal may be transmitted on an identical resource unit in a manner of being multiplexed with sidelink data. In this case, an SA resource pool may correspond to a pool of resources that an SA and sidelink data are transmitted in a manner of being multiplexed. The SA signal may also be referred to as a sidelink control channel or a physical sidelink control channel (PSCCH). The sidelink data channel (or, physical sidelink shared channel (PSSCH)) corresponds to a resource pool used by a transmitting UE to transmit user data. If an SA and a sidelink data are transmitted in a manner of being multiplexed in an identical resource unit, sidelink data channel except SA information may be transmitted only in a resource pool for the sidelink data channel. In other word, REs, which are used to transmit SA information in a specific resource unit of an SA resource pool, may also be used for transmitting sidelink data in a sidelink data channel resource pool. The discovery channel may correspond to a resource pool for a message that enables a neighboring UE to discover transmitting UE transmitting information such as ID of the UE, and the like.

Although contents of sidelink signal are identical to each other, it may use a different resource pool according to a transmission/reception attribute of the sidelink signal. For example, in case of the same sidelink data channel or the same discovery message, the sidelink data channel or the discovery signal may be classified into a different resource pool according to a transmission timing determination scheme (e.g., whether a sidelink signal is transmitted at the time of receiving a synchronization reference signal or the timing to which a prescribed timing advance is added) of a sidelink signal, a resource allocation scheme (e.g., whether a transmission resource of an individual signal is designated by an eNB or an individual transmitting UE selects an individual signal transmission resource from a pool), a signal format (e.g., number of symbols occupied by a sidelink signal in a time resource unit, number of time resource units used for transmitting a sidelink signal), signal strength from an eNB, strength of transmit power of a sidelink UE, and the like. For clarity, a method for an eNB to directly designate a transmission resource of a sidelink transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing sidelink discovery, if an eNB directly indicates a resource, it is referred to as a type 2. If a UE directly selects a transmission resource from a predetermined resource region or a resource region indicated by the eNB, it is referred to as type 1.

In V2X, sidelink transmission mode 3 based on centralized scheduling and sidelink transmission mode 4 based on distributed scheduling are available.

Figure 6:
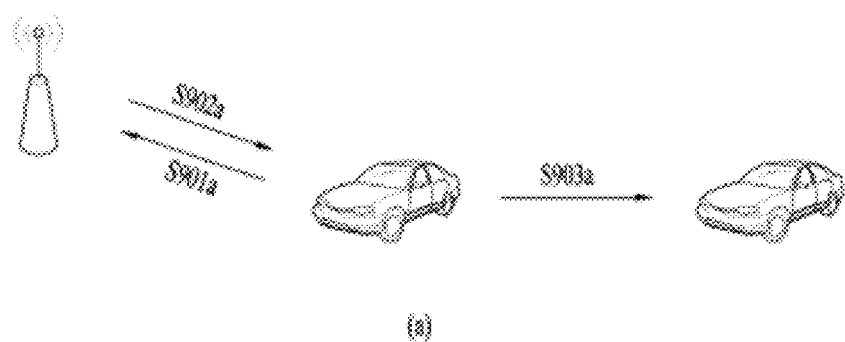
FIG. 6 is a diagram illustrating scheduling schemes according to sidelink transmission modes.
Figure 6:
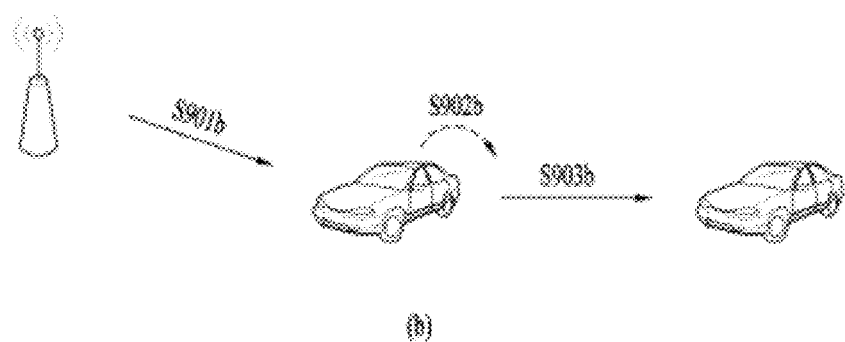

FIG. 6 illustrates scheduling schemes according to these two transmission modes. Referring to FIG. 6, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 6(*b*), a vehicle selects transmission resources (S902b), while sensing resources preconfigured by to the eNB, that is, a resource pool (S901b), and then transmits a signal in the selected resources to another vehicle (S903b).

Figure 7:
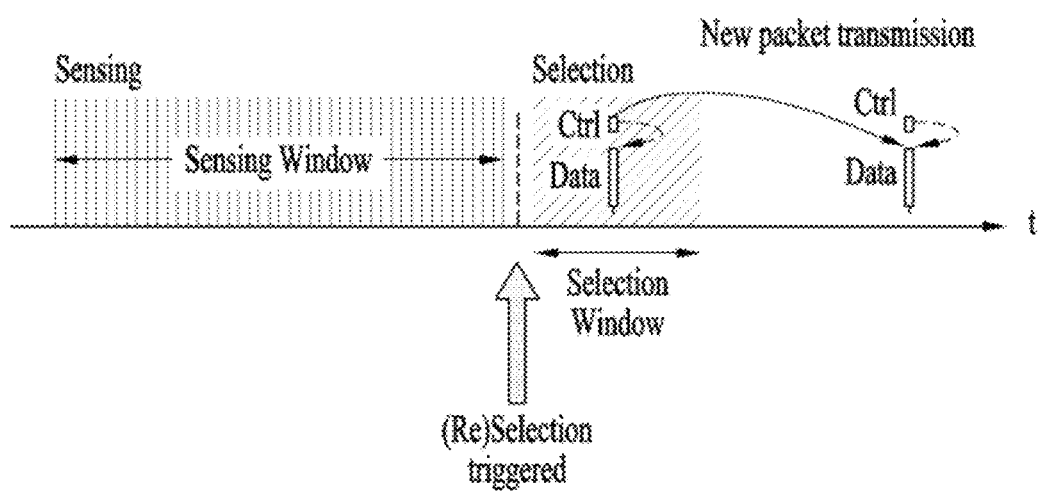
FIG. 7 is a view showing selection of sidelink transmission resources.

At this time, as shown in FIG. 7, in selection of transmission resources, a method of reserving transmission resources of a next packet is used. In V2X, transmission is performed twice for each MAC PDU and resources for retransmission are reserved at a certain time gap when resources for initial transmission are selected A UE may grasp transmission resources reserved by other UEs or resources used by other UEs through sensing in a sensing window and randomly select resources from resources with little interference among the remaining resources after excluding the used resources from the selection window.

For example, the UE may decode a PSCCH including information on the period of reserved resources in the sensing window and measure a PSCCH RSRP in the resources periodically determined based on the PSCCH. Resources in which the PSSCH RSRP value exceeds a threshold may be excluded from the selection window. Thereafter, sidelink resources may be randomly selected from the remaining resources in the selection window.

Alternatively, received signal strength indication (RSSI) of periodic resources may be measured in the sensing window to grasp resources with little interference corresponding to the bottom 20%. In addition, sidelink resources may be randomly selected from the resources included in the selection window among the periodic windows. For example, when decoding of the PSCCH fails, such a method may be used.

For a detailed description thereof, refer to Section 14 of 3GPP TS 36.213 V14.6.0 document, which is incorporated herein as the related art of the present disclosure.

Transmission/Reception of PSCCH

Sidelink transmission mode 1 UE may transmit a PSCCH (or sidelink control signal or sidelink control information (SCI)) through resources configured by an eNB. Sidelink transmission mode 2 UE may receive resources which are configured by the eNB to be used for sidelink transmission. In addition, time/frequency resources may be selected from the configured resources to transmit a PSCCH.

Figure 8:
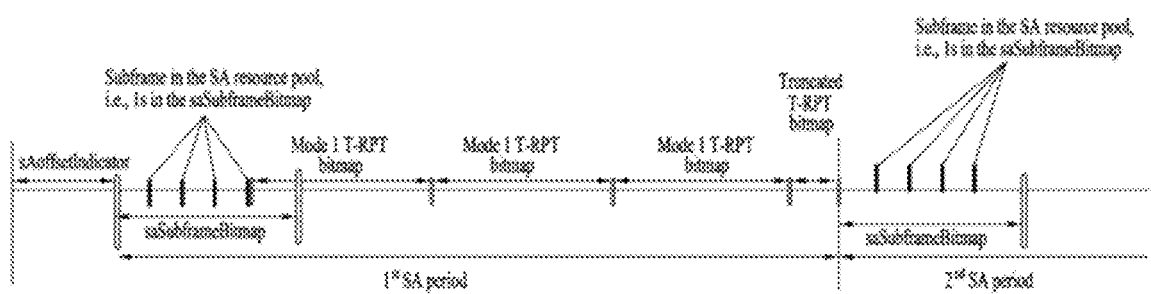
FIG. 8 is a view showing transmission of a sidelink PSCCH.

In sidelink transmission mode 1 or 2, a PSCCH period may be defined as shown in FIG. 8.

Referring to FIG. 8, a first PSCCH (or SA) period may start in a time resource unit separated from a specific system frame by a predetermined offset indicated by higher layer signaling. Each PSCCH period may include a PSCCH resource pool and a time resource unit pool for sidelink data transmission. The PSCCH resource pool may include a last time resource unit among time resource units indicated as transmission of a PSCCH in a time resource unit bitmap from a first time resource unit of a PSCCH period. In a resource pool for sidelink data transmission, in the case of mode 1, a time resource unit used for actual data transmission may be determined by applying time-resource pattern for transmission (T-RPT) or time-resource pattern (TRP). As shown in the figure, if the number of time resource units included in the PSCCH period excluding the PSCCH resource pool is greater than the number of T-RPT bits, T-RPT is repeatedly applicable and last applied T-RPT may be truncated by the number of remaining resource units and applied. A transmission UE performs transmission at a location where a T-RPT bitmap is 1 in the indicated T-RPT, and one MAC PDU is transmitted four times.

Figure 9:
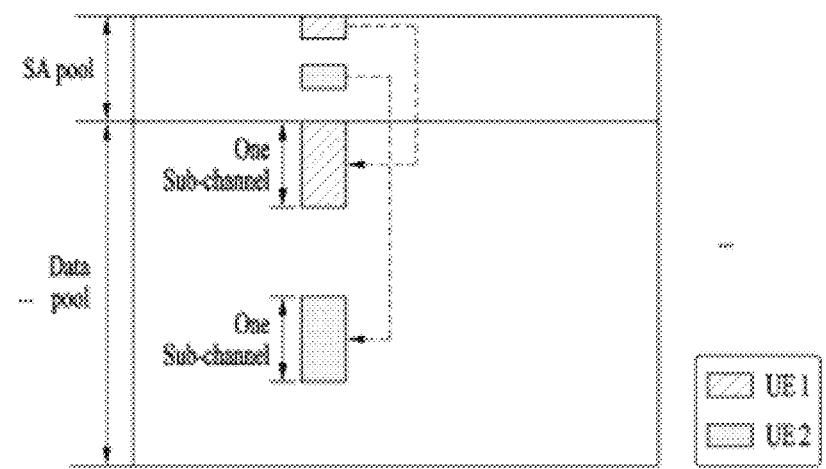
FIG. 9 is a view showing transmission of a PSCCH in sidelink V2X.
Figure 9:
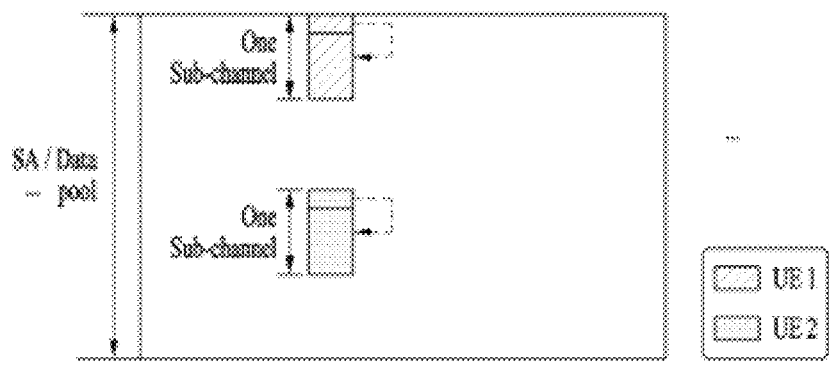

In the case of V2X, that is, sidelink transmission mode 3 or 4, unlike sidelink, a PSCCH and data (PSSCH) are transmitted using a FDM scheme. In V2X, because of the characteristics of vehicle communication, it is important to reduce delay. To this end, the PSCCH and data are FDM-transmitted on different frequency resources on the same time resources. FIG. 9 shows an example of such a transmission scheme. Any one of a scheme in which the PSCCH and the data are not directly contiguous as shown in FIG. 9(a) or a scheme in which the PSCCH and the data are directly contiguous as shown in FIG. 9(b) may be used. The basic unit of such transmission is a subchannel. The subchannel is a resource unit having a size of one or more RBs on a frequency axis on a predetermined time resource (e.g., a time resource unit). The number of RBs included in the subchannel, that is, the size of the subchannel and the start location on the frequency axis of the subchannel are indicated through higher layer signaling.

Meanwhile, in vehicle-to-vehicle communication, a periodic message type cooperative awareness message (CAM), an event triggered message type decentralized environmental notification message (DENM), etc. may be transmitted. The CAM may include vehicle dynamic state information such as a direction and a speed, vehicle static data such as dimensions and basic vehicle information such as external lighting states and a mute history. The size of the CAM may be 50 to 300 bytes. The Cam may broadcast and latency needs to be less than 100 ms. The DENM may be generated in unexpected situations such as vehicle breakdown or accidents. The size of the DENM may be less than 3000 bytes, and all vehicles in a transmission range may receive the message. At this time, the DENM may have higher priority than the CAM. The message having higher priority may mean that the message having higher priority is preferentially transmitted when two messages need to be simultaneously from the viewpoint of one UE or mean that a message having higher priority among several messages is preferentially transmitted in terms of time. From the viewpoint of several UEs, a message having higher priority has less interference than a message having lower priority, thereby decreasing a reception error probability. Even in the CAM, the size of the message when security overhead is included may be larger than that of the message when security overhead is not included Sidelink Congestion Control A sidelink communication wireless environment may be congested according to the density of vehicles, increase in the amount of transmitted information, etc. At this time, various methods are applicable in order to reduce congestion. As one example, there is distributive congestion control.

In distributive congestion control, a UE grasps a congestion situation of a network and performs transmission control. At this time, congestion control considering priority of traffic (e.g., packets) is necessary.

Specifically, each UE measures a channel busy ratio (CBR) and determines a maximum value CRlimitk of a channel utilization CRk for each traffic priority (e.g., k) according to the CBR For example, the UE may derive the maximum value CRlimitk of the channel utilization for each traffic priority based on the CBR measurement value and a predetermined table. In the case of traffic having relatively high priority, a larger maximum value of the channel utilization may be derived.

Thereafter, the UE may perform congestion control by limiting the total sum of the channel utilization of traffics having priority k lower than i. According to this method, the channel utilization of traffics having relatively lower priorities are more strictly limited.

Besides, the UE may use size adjustment of transmit power, packet drop, determination of retransmission, transmission RB size adjustment (MCS adjustment), etc.

Meanwhile, Table 2 below discloses some of the matters agreed in 3GPP RAN 1 #91, which is incorporated herein as the related art of the present disclosure.

TABLE 2

| RAN1 #91 agreement |
|---|
| Agreement<br>    Confirm the following working assumption made in RAN1#90bis meeting with the following update:<br>        For a given MAC PDU, RAN1 assumes that a single carrier is provided by higher layer for its transmission.<br>        From RAN1 perspective, the following factors can be taken into account for TX carrier selection.<br>            CBR<br>            UE capability (e.g. number of TX chains, implementation related aspects such as power budget sharing<br>            capability, TX chain returning capability)<br>        For a given MAC PDU, a single carrier is used for transmission and potential retransmission of this MAC PDU<br>        From RAN1 perspective, once a carrier is selected, the same carrier is used for all MAC PDUs of the same sidelink<br>        process at least until resource reselection as triggered for that same sidelink process based on Rel-14 triggering<br>        conditions and, if any, new Rel-15 triggering conditions.<br>            Note that the UE is not precluded for switch transmission chains between component carriers for different<br>sidelink processes. |

TABLE 3

Agreement
From RAN1 understanding, the limited TX capability means that the UE cannot supported transmission(s) over carrier (s)
subframe due to
    (a) Number of TX chains smaller than the number of configured TX carriers or
    (b) UE doesn't support the given band combination or
    (c) TX chain switching time or
    (d) UE cannot fulfill the RF requirement due to e.g. PSD imbalance
For a UE with limited TX capability, RAN1 considers the following options for resource selection in mode 4-CA.
    Option 1-1: When the UE performs the resource selection for a certain carrier, any subframe of that carrier sharing
    excluded from the reported candidate resource set if using that subframe exceeds its TX capability limitation under
    the given resource reservation in the other carriers.
        FFS details, e.g. the carrier resource selection order should consider PPFP of transmission and CBR
    Option 1-2: If the per-carrier independent resource selection leads to transmissions beyond the TX capability of
    UE in a subframe, UE re-does resource reselection within the given reported candidate resource set until the resultant
    transmission resources can be supported by the CE.
        FFS: whether it is up to UE implementation
        FFS details, e.g. the carrier resource selection order should consider PPPP of transmission and CBR.
    Option 2: After performing the per-carrier independent resource selection, the UE shall drop transmission in a
    subframe where using that subframe exceeds its TX capability limitation.
        FFS details of dropping rule, e.g. whether/how to consider PPPP and CBR
    FFS whether/how to consider other aspects (e.g. half duplex problem) in terms of resource selection

TABLE 4

Down-select one combination among the followings:
    Option 1-1 for (a), (b), and (c)
        the UE shall drop transmission in a subframe where using that subframe is beyond TX capability with (d)
    Option 1-1 for (a), (b), and (c)
        UE re-does resource reselection within the given reported candidate resource set until the resultant
        transmission resources fulfill TX capability with (d)
    Option 1-2 for (a), (b), and (c), + Option 2 for (d)
    Option 1-1 for (a), (b), (c), and (d)
    Option 1-2 for (a), (b), (c), and (d)
    Option 2 for (a), (b), (c), and (d)
Agreement
    RAN1 specification of CA for LTE-V2X will be also applicable to "reception over non-contiguous carrier", which
    RAN1 considers to be useful, in some operations scenarios
    Inform RAN4 of the above RAN1 understanding - LS (R1-1721270) - Hanbyul (LGE) - Final verion is agreed in
    R1-
    1721285

PSSCH Transmit Power

In sidelink transmission mode 4, the transmit power $P_{PSSCH}$ of the UE for PSSCH transmission on a subframe n is expressed by Equation 1 below.

$$P_{PSSCH} = 10\log_{10}\left(\frac{M_{PSSCH}}{M_{PSSCH} + 10^{\frac{3}{10}} \times M_{PSCCH}}\right) + A \quad [dBm], \quad \text{Equation 1}$$

In Equation 1 above, $P_{CMAX}$ denotes maximum output power configured in a service cell c. $M_{PSSCH}$ denotes bandwidth of PSSCH resource allocation expressed by the number of RBs, and $M_{PSCCH}=2$. PL=$PL_c$, and $PL_c$ is pass loss in the serving cell c. $P_{O\_PSSCH,4}$ and $\alpha_{PSSCH,4}$ are values indicated through higher layer signaling. If a higher layer parameter maxTxpower is configured, A may be expressed by Equation 2 below and, otherwise, A may be expressed by Equation 3 below.

$$A=\min\{P_{CMAX}, P_{MAX\_CBR}, 10 \log_{10}(M_{PSSCH} + 10^{3/10} \times M_{PSCCH}) + P_{O\_PSSCH,4} + \alpha_{PSSCH,4} \cdot PL\} \quad \text{Equation 2}$$

$$A=\min\{P_{CMAX}, 10 \log_{10}(M_{PSSCH} + 10^{3/10} \times M_{PSCCH}) + P_{O\_PSSCH,4} + \alpha_{PSSCH,4} \cdot PL\} \quad \text{Equation 3}$$

where, $P_{MAX\_CBR}$ is set to a value maxTxpower based on a CBR range including a CBR measured in a subframe n-4 and a priority level of a PSSCH.

For PSSCH transmit power in the other sidelink transmission modes 1 to 3, refer to the 3GPP TS 36.213 document.

MPR

In connection with the transmit power determination, the UE may configure the maximum output power $P_{CMAX,c}$ configured for the serving cell in the range of Equation 4 below.

$$P_{CMAX\_L,c} \leq P_{CMAX,c} \leq P_{CMAX\_H,c} \quad \text{Equation 4}$$

In Equation 4 above, $P_{CMAX\_L,c}$ and $P_{CMAX\_H,c}$ are defined by Equations 5 and 6 below, respectively.

$$P_{CMAX\_L,c}=\text{MIN}\{P_{EMAX,c}-\Delta T_{C,c}, (P_{PowerClass}-\Delta P_{PowerClass})-\text{MAX}(MPR_c+A-MPR_c+\Delta T_{IB,c}+\Delta T_{C,c}+\Delta T_{ProSe}, P-MPR_c)\} \quad \text{Equation 5}$$

$$P_{CMAX\_H,c}=\text{MIN}\{P_{EMAX,c}, P_{PowerClass}-\Delta P_{PowerClass}\} \quad \text{Equation 6}$$

In the above equations, $P_{EMAX,c}$ denotes a value provided by the information element IE P-Max of an RRC message for the serving cell c. $P_{PowerClass}$ denotes maximum UE power which does not consider tolerance. $\Delta T_{IB,c}$ denotes additional tolerance for the serving cell c. $\Delta T_{C,c}$ is 1.5 dB or 0 dB. P-MPRc is allowed maximum output power reduction.

MPRc denotes maximum Power Reduction value for the serving cell c, and A-MPRc denotes additional maximum power reduction value for the serving cell c. Table 5 below shows a MPR value according to a relationship between modulation scheme and channel bandwidth/transmission bandwidth.

TABLE 5

| Modulation | Channel bandwidth/Transmission bandwidth ($N_{RB}$) | | | | | | MPR (dB) |
| --- | --- | --- | --- | --- | --- | --- | --- |
| | 1.4 MHz | 3.0 MHz | 5 MHz | 10 MHz | 15 MHz | 20 MHz | |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |
| 64 QAM | ≤5 | ≤4 | ≤8 | ≤12 | ≤16 | ≤18 | ≤2 |
| 64 QAM | >5 | >4 | >8 | >12 | >16 | >18 | ≤3 |
| 256 QAM | ≥1 | | | | | | ≤5 |

MPR for Prose, V2X, etc. is defined in 3GPP TS 36.101.

Embodiment

Hereinafter, the present disclosure proposes a resource selection method of a UE when carrier aggregation is supported in direct communication between UEs, based on the above description.

Here, the carrier may mean the carrier in the 3GPP standard, but is not limited thereto, and may be understood as predetermined a frequency resource in bandwidth by those skilled in the art. Accordingly, bandwidth part may correspond to a predetermined frequency resource in bandwidth. In the following description, a representative term "frequency resource" is used, which may refer to a carrier or bandwidth part. In the description of the present disclosure, for a bandwidth combination set, refer to the 3GPP TS 36.101 document. Except for the below description, for resource selection and sidelink signal transmission of the UE, refer to Section 14 of the 3GPP TS 36.213 document, which is incorporated herein as the present disclosure.

The number of carriers which may be selected by the UE at a specific time may be limited according to Tx capability. At this time, limitation according to Tx capability may be divided into the following four cases.

(a) Number of TX chains smaller than the number of configured TX carriers or (b) UE doesn't support the given band combination or (c) TX chain switching time or (d) UE cannot fulfill the RF requirement due to, e.g., PSD imbalance The embodiment of the resource selection method of the UE related to (a) to (d), and, more particularly, (b) will be described.

Figure 10:
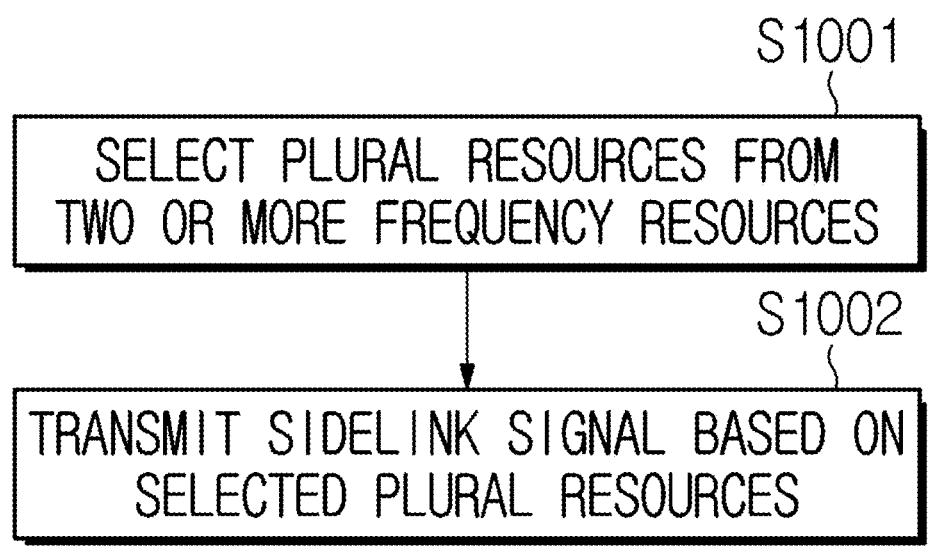
FIG. 10 is a flowchart illustrating an embodiment of the present disclosure.

Referring to FIG. 10, the UE according to the embodiment of the present disclosure may select a plurality of resources from two or more frequency resources (S1001) and transmit a sidelink signal based on the plurality of selected resources (S1002). The UE may select the plurality of resources based on i) continuity of frequency resources ii) maximum power reduction (MPR) in sequence. The UE may preferentially select the plurality of resources from two or more continuous frequency resources. In addition, when there is no resource to be selected from the two or more continuous frequency resources, the plurality of resources may be selected according to MPR according to a combination of two or more frequency resources.

That is, for example, a resource selected from contiguous frequency resources is set to first priority and, when there is no resource to be selected from the contiguous frequency resources, a resource may be selected from non-contiguous frequency resources. In addition, priorities of non-contiguous frequency resources may be determined according to the MPR according to a band combination. Here, the smaller the MPR according to the combination of the two or more frequency resources, the higher a priority. That is, when the MPR is large, the band combination may be regarded as having low priority.

In the above configuration, the UE selects resources from contiguous frequency resources as much as possible. If not configured as described above, selection of resources from discontinuous frequency resources is frequently performed and interference may be problematic due to unnecessary emission occurring in this case. In order to reduce interference, transmit power needs to be limited. However, when transmit power is reduced, coverage is reduced, thereby limiting the coverage of sidelink signal transmission.

Subsequently, when different MPRs are applied to a band combination for each combination (e.g., when 0-dB MPR is applied if contiguous resources are selected and x-dB MPR is applied if non-contiguous resources are selected), the following methods may be used.

For example, MPR may be considered in a resource selection probability. When the UE selects the plurality of resources from the two or more frequency resources for frequency resource, a resource selection probability of frequency resources contiguous to a first selected frequency resource may increase to by the inversely proportional function of the MPR That is, if it is assumed that resources are sequentially selected for each frequency resource, when a specific frequency resource was previously selected, a method of increasing a resource selection probability of resources contiguous to the selected frequency by the inversely proportional function of the MPR is considered.

As another example, when the UE selects the plurality of resources from resources each having a measured signal strength equal to or less than a preset value, the MPR may be added to the measured signal strength as a positive offset value. The measured signal strength may be a sidelink received signal strength indicator (S-RSSI). The MPR is used as the offset of the S-RSSI. In random selection from resources having an S-RSSI less than x %, the MPR may be added to the S-RSSI in the frequency resources, to which the MPR is likely to be applied, as the positive offset. At this time, the frequency resources, to which the MPR is added as the positive offset, may be excluded from a resource selection candidate set.

Alternatively, the MPR may be used as the offset of X %. For example, in a combination of frequency resources in which the MPR is not 0, only resources of Y % (<=x) may be considered as candidate resources.

In the above description, the MPR is directly used as the offset of the parameter. However, the function of the MPR may be used as the offset of the parameter. In the above method, the MPR may be considered in frequency resource selection. When the MPR is considered in frequency resource selection, additional operation may not be performed at the time of resource selection.

Meanwhile, a band combination may be considered in frequency resource selection, which will be described below. The following description may be applied along with the above-described methods.

The UE may select the frequency resources based on a channel busy ratio (CBR). At this time, the UE may always select the two frequency resources based on a sum of the CBRs of continuous frequency resources. That is, when the frequency resources are selected based on the CBR, the frequency resources may be selected based on the sum of the CBRs of continuous frequency resources. In this method, the UE may always select only contiguous band combinations. At this time, a method of considering a CBR is to select Tx frequency resources having a CBR sum lower than that of contiguous band combinations possible in TX capability. Even at this time, the MPR of non-contiguous frequency resources may be considered in frequency resource selection. By applying an additional offset of the CBR by the MPR or the offset value according to the function of the MPR in the sum of CBRs, contiguous to frequency resources may not be biased and non-contiguous frequency resource combinations may be biased. The MPR may be used as an offset or an offset may be determined in the form of the function of MPR If the MPR is equal to or greater than 0, a specific offset value may be used. For example, when the sum of the CBRs of contiguous frequency resources is X_c and the sum of the CBRs of non-contiguous frequency resources is X_nc, X_nc+a (where, a being an offset determined by the function of the MPR) is used as the measured value of the CBR sum of frequency resource selection.

In addition, the UE may preferentially select continuous frequency resources when the sum of the CBRs of frequency resources is equal to or less than a preset value. That is, when a difference between loads of frequency resources is less than a certain threshold, a combination of contiguous frequency resources is always selected preferentially or with high priority.

Alternatively, when the sum of the CBRs of the frequency resources is equal to or less than a preset value, the UE may always select continuous frequency resources randomly or by implementation of the UE. When frequency resource selection is performed using only the CBR in consideration of load balancing, non-contiguous frequency resources may be excessively selected. When a difference between loads (CBRs) of frequency resources is less than or less than and equal to a certain level, the loads are regarded as being the same and the UE may freely perform continuous frequency resource selection according to implementation.

Here, the difference between the CBRs which may be regarded as the same CBR level may be predetermined or signaled by a network through a physical layer or higher layer signal.

Meanwhile, the following operation may be considered with respect to how to reflect "(d) UE cannot fulfill the RF requirement due to, e.g., PSD imbalance" in frequency resource selection or resource selection.

Frequency resource selection is performed according to CBR, Tx capability or band combination, a PSD condition may not be considered in frequency resource selection A power spectral density (PSD) difference condition may be considered in resource selection. If a PSD difference is equal to or greater than a certain level in a specific band combination, resource selection from specific frequency resources may be dropped.

When frequency resources are selected, the PSD difference may always be selected in a certain range. The UE should consider this condition when power is set. The UE may reduce transmit power by adjusting power having high PSD to power having low PSD after a Tx total power condition is first satisfied.

In order to select frequency resources and enable a PSD difference to be within a certain range, a difference in allocated RB size should be within a certain threshold. Accordingly, in order to enable the PSD difference to be within the certain range, the PSD limit condition may be used as a constraint for resource size selection for each frequency resource. Resources are all selected for each frequency resource and may be dropped based on PPPP when the PSD conditions are not satisfied.

The present disclosure is not limited to direct communication between UEs, and may be used in uplink or uplink. At this time, an eNB or a relay node may use the proposed method.

It is obvious that the examples of the proposed method described above may also be included as one of the implementation methods of the present disclosure, and thus may be regarded as a kind of proposed methods. Further, the above-described proposed methods may be implemented independently, but may also be implemented in a combination (or merged) form of some of the proposed methods. Rules may be defined such that an eNB or a transmission UE notifies a UE or a reception UE of information indicating whether or not to apply the proposed methods (or information on the rules of the proposed methods) through a predefined signal (e.g., a physical layer signal or a higher layer signal).

Apparatus Configuration According to the Embodiment of the Present Disclosure

Figure 11:
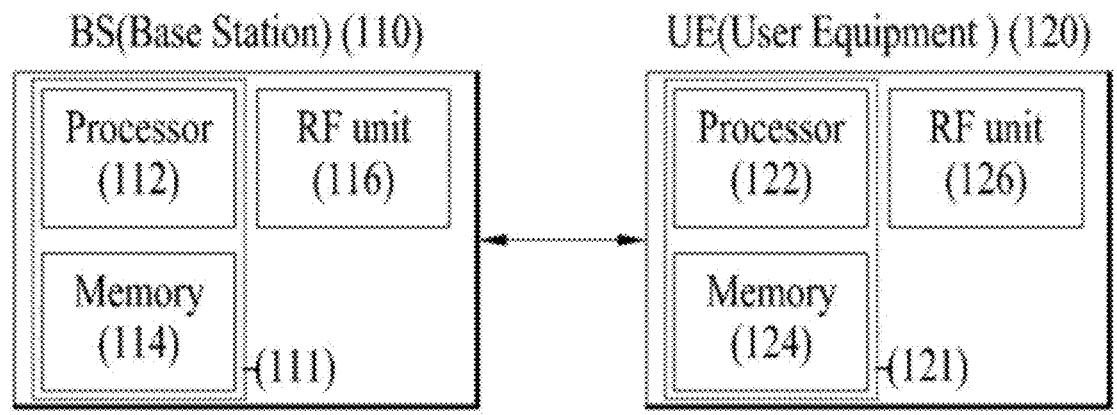
FIG. 11 is a view illustrating an apparatus of the present disclosure.

Referring to FIG. 11, a wireless communication system includes a base station (BS) 110 and a UE 120. When the wireless communication system includes a relay, the BS or the UE may be replaced with the relay.

The BS 110 includes a processor 112, a memory 114 and a radio frequency (RF) unit 116. The processor 112 may be configured to control the memory 114 and/or the RF unit 116 and to implement the above-described/proposed procedures and/or methods. For example, the processor 112 may process information in the memory 114 to generate first information/signal and then transmit a wireless signal including the first information/signal through the RF unit 116. In addition, the processor 112 may receive a wireless signal including second information/signal through the RF unit 116 and then store information obtained by processing the second information/signal in the memory 114. For example, the processor 112 includes a communication modem designed to implement wireless communication technology (e.g., LTE or NR). The memory 114 is connected to the processor 112 to store a variety of information related to operation of the processor 112. For example, the memory 114 may store software code including commands for performing some or all of the processes controlled by the processor 112 or performing the to above-described/proposed procedures and/or methods. The RF unit 116 is connected to the processor 112 to transmit and/or receive a wireless signal. The RF unit 116 may include a transmitter and/or a receiver. The RF unit 116 may be replaced with a transceiver. Here, the processor 112 and the memory 114 may be parts of a processing chip (e.g., system on chip (SoC) 111.

The UE 120 includes a processor 122, a memory 124 and a radio frequency (RF) unit 126. The processor 122 may be configured to control the memory 124 and/or the RF unit 126 and to implement the above-described/proposed procedures and/or methods. For example, the processor 122 may process information in the memory 124 to generate third information/signal and then transmit a wireless signal including the third information/signal through the RF unit 126. In addition, the processor 122 may receive a wireless signal including fourth information/signal through the RF unit 126 and then store information obtained by processing the fourth information/signal in the memory 124. As a detailed example, the processor may select a plurality of resources from two or more frequency resources and transmit a sidelink signal based on the plurality of selected resources. The processor may select the plurality of resources based on i) continuity of frequency resources ii) maximum power reduction (MPR) in sequence.

For example, the processor 122 includes a communication modem designed to implement wireless communication technology (e.g., LTE or NR). The memory 124 is connected to the processor 122 to store a variety of information related to operation of the processor 122. For example, the memory 124 may store software code including commands for performing some or all of the processes controlled by the processor 122 or performing the above-described/proposed procedures and/or methods. The RF unit 126 is connected to the processor 122 to transmit and/or receive a wireless signal. The RF unit 126 may include a transmitter and/or a receiver. The RF unit 126 may be replaced with a transceiver. Here, the processor 122 and the memory 124 may be parts of a processing chip (e.g., system on chip (SoC) 121.

According to the present disclosure, it is possible to solve problems such as interference, coverage limit, etc. due to unnecessary emission.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

Those skilled in the art will appreciate that the present disclosure may be carried out in other specific ways than those set forth herein without departing from the spirit and essential characteristics to of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

In this disclosure, the embodiments of the present disclosure have been described centering on a data transmission and reception relationship between a UE and a BS. Such a transmission/reception relationship extends equally/similarly to signal transmission/reception between a terminal and a relay or between a base station and a relay. In this disclosure, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), gNode B (gNB), access point, etc. The term terminal may also be replaced with a user equipment (UE), a mobile station (MS) or a mobile subscriber station (MSS).

The embodiments of the present disclosure may be achieved by various techniques, for example, hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the implementations of the present disclosure may be implemented in the form of a module, a procedure, a function, etc. Software code may be stored in the memory unit and executed by the processor. The memory unit may be located inside or outside the processor and may transmit data to and receive data from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative to and not restrictive. The scope of the disclosure should be determined by the appended claims and their legal equivalents, not by the above description, and all changes coming within the meaning and equivalency range of the appended claims are intended to be embraced therein.

The above-described embodiments of the present disclosure are applicable to various mobile communication systems.

What is claimed is:

1. A method of transmitting a sidelink signal by a user equipment (UE) in a wireless communication system, the method comprising:
   performing synchronization based on a sidelink synchronization signal (SLSS), wherein the SLSS includes primary sidelink synchronization signal (PSSS) and secondary sidelink synchronization signal (SSSS);
   determining one or more resource pools, wherein the one or more resource pools are configured by a base station based on sidelink resource allocation mode 1, and the one or more resource pools are determined by the UE based on sidelink resource allocation mode 2, wherein a resource pool includes a plurality of contiguous frequency resources in a frequency domain, and a set of slots in a time domain;
   selecting a plurality of resources of the time domain and a plurality of resources of frequency domain in the resource pool;
   transmitting a sidelink signal based on the selected plurality of resources of the time domain and the plurality of resources of the frequency domain in the resourse pool;
   wherein contiguous frequency resources are selected by the UE based on the plurality of resources of the frequency domain being selected,
   wherein, when there is no resource to be selected from the two or more contiguous frequency resources, the plurality of resources of the frequency domain is selected from a combination of two or more non contiguous frequency resources based on a power spectral density (PSD) difference,
   wherein a PSD condition is not satisfied when the PSD difference is equal to or greater than a certain level in a combination of the two or more non contiguous frequency resources, and wherein a specific frequency resource of the two or more non contiguous frequency resources is dropped based on a ProSe Per-Packet Priority (PPPP) when the PSD condition is not satisfied.

2. The method of claim 1, wherein the UE selects the plurality of resources based on a maximum power reduction (MPR) in sequence when there is no resource to be selected from the two or more contiguous frequency resources, and
the smaller the MPR according to a combination of two or more frequency resources, the higher a priority.

3. The method of claim 2, wherein, when the UE selects the plurality of resources from the two or more frequency resources for each frequency resource, a resource selection probability of frequency resources contiguous to a first selected frequency resource increases by an inversely proportional function of MPR.

4. The method of claim 2 wherein, when the UE selects the plurality of resources from resources each having a measured signal strength equal to or less than a predetermined value, the MPR is added to the measured signal strength as a positive offset.

5. The method of claim 4, wherein the measured signal strength is a sidelink received signal strength indicator (S-RSSI).

6. The method of claim 1, wherein the frequency resources are one of carriers or bandwidth parts.

7. The method of claim 1, wherein the UE selects the frequency resources based on a channel busy ratio (CBR).

8. The method of claim 7, wherein the UE always selects the two frequency resources based on a sum of CBRs of continuous frequency resources.

9. The method of claim 7, wherein the UE preferentially selects continuous frequency resources when a sum of CBRs of frequency resources is equal to or less than a preset value.

10. The method of claim 7, wherein the UE randomly selects the frequency resources when a sum of CBRs of frequency resources is equal to or less than a preset value.

11. A user equipment (UE) apparatus for transmitting a sidelink signal in a wireless communication system, the UE apparatus comprising:

a memory; and
a processor coupled to the memory,
wherein the processor:
performs synchronization based on a sidelink synchronization signal (SLSS), wherein the SLSS includes primary sidelink synchronization signal (PSSS) and secondary sidelink synchronization signal (SSSS),
determines one or more resource pools, wherein the one or more resource pools are configured by a base station based on sidelink resource allocation mode 1, and the one or more resource pools are determined by the UE based on sidelink resource allocation mode 2, wherein a resource pool includes a plurality of contiguous frequency resources in a frequency domain, and a set of slots in a time domain;
selects a plurality of resources of the time domain and a plurality of resources of frequency domain in the resource pool,
transmits a sidelink signal based on the selected plurality of resources of the time domain and the plurality of resources of the frequency domain in the resource pool,
wherein contiguous frequency resources are selected by the UE based on the plurality of resources of the frequency domain being selected,
wherein, when there is no resource to be selected from the two or more contiguous frequency resources, the plurality of resources of the frequency domain is selected from a combination of two or more non contiguous frequency resources based on a power spectral density (PSD) difference,
wherein a PSD condition is not satisfied when the PSD difference is equal to or greater than a certain level in a combination of the two or more non contiguous frequency resources, and
wherein a specific frequency resource of the two or more non contiguous frequency resources is dropped based on a ProSe Per-Packet Priority (PPPP) when the PSD condition is not satisfied.

* * * * *